United States Patent
Holma et al.

(10) Patent No.: US 7,336,616 B2
(45) Date of Patent: Feb. 26, 2008

(54) CONFIGURING A DATA TRANSMISSION INTERFACE IN A COMMUNICATION NETWORK

(75) Inventors: Maunu Holma, Helsinki (FI); Jari Isokangas, Tampere (FI); Esa Metsälä, Espoo (FI)

(73) Assignee: Nokia Corporation, Espoo (FI)

( * ) Notice: Subject to any disclaimer, the term of this patent is extended or adjusted under 35 U.S.C. 154(b) by 892 days.

(21) Appl. No.: 10/433,858

(22) PCT Filed: Dec. 11, 2000

(86) PCT No.: PCT/EP00/12507

§ 371 (c)(1),
(2), (4) Date: Nov. 10, 2003

(87) PCT Pub. No.: WO02/49381

PCT Pub. Date: Jun. 20, 2002

(65) Prior Publication Data

US 2004/0071094 A1    Apr. 15, 2004

(51) Int. Cl.
*H04L 12/26* (2006.01)
(52) U.S. Cl. ............................ 370/252; 370/310
(58) Field of Classification Search ............. 370/252, 370/310, 310.1, 310.2, 315, 328, 338
See application file for complete search history.

(56) References Cited

U.S. PATENT DOCUMENTS 5,777,988 A   7/1998   Cisneros
6,128,287 A   10/2000  Freeburg et al.

(Continued)

FOREIGN PATENT DOCUMENTS

WO    WO 99/33319    7/1999

(Continued)

OTHER PUBLICATIONS

Boldt, et al., "Modeling an ATM/Based Access Network for 3rd Generation Mobile Communication Networks", vol. 3, Conf. 48, May 18, 1998, pp. 2590-2593.

*Primary Examiner*—Min Jung
(74) *Attorney, Agent, or Firm*—Squire Sanders & Dempsey L.L.P.

(57) ABSTRACT

The present invention proposes a method for configuring a data transmission interface in a communication network adopting a transmission protocol for transmission of data in units of grouped data, wherein said transmission interface is the interface (Iub) between an access network control node (RNC1) and an access node (BS1-BS6) adapted to establish a communication to a terminal, and wherein said communication network has a topology such that an access node (BS2, BS3, BS5, BS6) is connected to said access network control node (RNC1) by an intermediate of at least one further access node (BS1,BS1-BS2, BS4, BS4), said method comprising the steps of: deriving a delay information of the delay experienced by data transmission between a respective network access node (BS1-BS6) and said access network control node (RNC), calculating a delay difference between two consecutive access nodes (BS1-BS2, BS2-BS3, BS4-BS5, BS4-BS6) based on said delay information, and modifying the delay experienced by data transmission for the respective access node which is identified by the respective smaller delay. Also, the present invention proposes an accordingly adapted access network control node as well as accordingly adapted access nodes.

21 Claims, 2 Drawing Sheets

U.S. PATENT DOCUMENTS

| | | | |
|---|---|---|---|
| 6,735,180 B1 * | 5/2004 | Malkamaki et al. | 370/282 |
| 6,807,421 B1 * | 10/2004 | Ahmavaara | 455/438 |
| 7,031,701 B1 * | 4/2006 | Ahmavaara et al. | 455/423 |
| 2005/0221849 A1 * | 10/2005 | Van Lieshout et al. | 455/509 |

FOREIGN PATENT DOCUMENTS

| | | |
|---|---|---|
| WO | WO 99/50972 | 10/1999 |
| WO | WO 00/28744 | 5/2000 |

* cited by examiner

CONFIGURING A DATA TRANSMISSION INTERFACE IN A COMMUNICATION NETWORK

BACKGROUND OF THE INVENTION

1. Field of the Invention

The present invention relates to a method for configuring a data transmission interface in a communication network adopting a transmission protocol for transmission of data in units of grouped data.

2. Description of the Prior Art

Typically, a communication network comprises a core network which is independent of the connection technology used and handles "administrative" topics occurring in the network, as well as an access network. The access network is in charge of enabling terminals to access the communication network for communicating via the network with other terminals. The access network is dependent on the technology used for establishing connection with terminals (for example wireless or non-wireless connection).

For explanatory purposes only, the present description focuses on a wireless access network which is commonly referred to as radio access network (RAN), which enables terminals to access the network via an air-interface.

Thus, the radio access network RAN as referred to in the present description means a so-called $3^{rd}$ generation RAN (3GRAN) conforming to the standards elaborated by the $3^{rd}$ generation partnership project (3GPP).

Nevertheless, the principles as outlined in the present invention are intended to be understood in its broadest sense. Therefore, the communication network described in the present description is intended to mean any communication network, whether for mobile or non-mobile communication, as long as the communication network utilizes a packet or cell switched transmission protocol, that is a transmission protocol for transmission of data in units of grouped data. Examples for such transmission protocols are the Asynchronous Transmission Mode (ATM) protocol or the Internet Protocol (IP). ATM may be used in connection with an access network or base station subsystem (BSS) operated on the basis of Wideband Code Divisional Multiple Access WCDMA, while IP may be used in connection with a base station subsystem (BSS) operated on the basis of WideBand Code Divisional Multiple Access WCDMA or operated fully on the basis of the IP protocol.

As regards the constitution and/or topology of the radio access network, a plurality of base stations BS (also referred to as Node_B) are provisioned as access nodes for establishing connection with terminals (mobile station MS or user equipment UE). The access nodes are in turn controlled by a radio network controller RNC (corresponding to a base station controller BSC in GSM systems).

The base stations BS are connected to the radio network controller RNC such that at least one access node (base station) is connected to the access network control node (radio network controller) by an intermediate of at least one further access node. There may also be access nodes that do not have any intermediate nodes, like BS1 and BS4, as shown in FIG. 2. Stated in other words, the base stations are provided in respective chains of typically two to five (or more) base stations, while a plurality of such chains may be connected in a star connection type to the radio network controller. Still further, within a chain of base stations, the chain may be branched to two or more branches. FIG. 2 shows an example for the topology of a radio access network RAN in which the base stations BS1 to BS6 are each provided with an ATM Cross Connect means AXC.

The interface via which the access nodes (base stations) communicate with the control node (radio network controller) is known as the Iub interface (corresponding to the Abis interface in GSM). Data transport via the Iub interface, however, is subject to delays and delay variations. A main objective in network design is the minimization of imposed delays and also the minimization of delay variations. The delays are typically caused due to network design particulars, and once a network topology has been chosen, the delays can not be altered any more. On the other hand, delay variations are often created by a mechanism that allows at least some trade-off between delay variation and network capacity utilization, i.e. the higher the capacity utilization is chosen, the higher delay variations are accepted, while the lower the capacity utilization is chosen, the smaller are the delay variations to be taken into account.

In connection with data transmission via the Iub interface, the Iub transport delay and delay variations are due to an accumulation of individual delays/delay variations originating from several components:

AAL2 (ATM Adaptation Layer type 2) shaping,
AAL2 multiplexing,
ATM multiplexing and switching and
transmission (via the physical transmission media).

Delay components as briefly introduced before are graphically represented in FIG. 1 for the case of a WCDMA transmission based base station subsystem BSS of the radio access network RAN. For a WCDMA based BSS, the delay components for transmission/transport include AAL2 multiplexing,
ATM multiplexing
PDH/SDH multiplexing (Plesiochronous Digital Hierarchy/Synchronous Digital Hierarchy) and
the physical transmission media (such as the microwave radio, fibres, copper wires etc.).

A total value of delay/delay variation between any base station BS and/or base transceiver station BTS and the radio network controller RNC is fixed and constant for every base station BS.

Now, with regard to FIG. 1, the delay components in a vertical column in the drawing representation correspond to an individual base station, while for a chained base station topology as shown in FIG. 2, the delays imposed on data transmission of individual columns are added for obtaining the overall delay. In this model, it has to be noted that for each base station BS connection to the RNC, only one AAL2 multiplexing delay is relevant, since the data need not be ATM adapted before reaching the RNC. Also, the dashed boxes in FIG. 1 indicate a non mandatory intermediate equipment operating up to and including the ATM layer.

Thus, FIG. 1 could be interpreted (when neglecting the dashed column in the middle) such that the left column represents base station BS4 in FIG. 2, while the right column represents the base station BS5 (or BS6) in FIG. 2.

Apparently, it can then be observed that the ATM switching delays and delay variations as well as the transmission delays heavily depend on the position of the respective base station in the topology of the transport and transmission network, which positions could qualitatively be characterized by the words "near" (for example BS4) or "far" (for example BS5 or BS6). This observation may be based on the model shown in FIG. 1 but also from the topology shown in FIG. 2, from which it becomes clear that BS1 being closer to the RNC than BS3 has inherently a lower transmission delay than BS3, and also that BS4 has inherently a lower transmission delay than BS5 (or BS6).

Just to give a numerical example, in such a topology ATM connections going up to the farthest base station are estimated to experience for example a 5 ms maximum delay or longer delay variations than ATM connections going to the nearest base station. Due to macrodiversity, however, the radio access network application can not make use of the maximum 5 ms delay advantage that the nearer base stations have over the farthest one, so the transport capacity utilization of the Iub interface is non-optimum.

The transport capacity utilization on the Iub interface, however, is rather crucial, since the Iub links requirements are often tight, especially when radio transmission is used (but also when wired transmission types are used). Thus, in existing scenarios, a capacity utilization of the Iub interface in the radio access networks is non-optimum.

A previous approach as proposed for standardization in the 3GPP is based on a fixed usage of the same fixed delay for AAL2/ATM delay for ATM packetization, multiplexing and depacketization on the Iub interface. The fixed value has been proposed to be 7 ms. Thus, with reference to FIG. 1, according to this proposal one source of additional delay variation has been removed by summarizing AAL2 multiplexing and ATM multiplexing blocks to a single delay component, while remaining delay variations (due to PDH/SDH multiplexing and/or used physical media) still adversely affect the capacity usage on the Iub interface.

SUMMARY OF THE INVENTION

The present invention improves the capacity utilization for the interface between the network access nodes and the access network control node.

The present invention is a method for configuring a data transmission interface in a communication network adopting a transmission protocol for transmission of data in units of grouped data, wherein the transmission interface is the interface between an access network control node and an access node adapted to establish a communication or which establishes a communication to a terminal, and wherein the communication network has a topology such that an access node is connected to the access network control node by an intermediate of at least one further access node, the method comprising the steps of: deriving a delay information of the delay experienced by data transmission between a respective network access node and the access network control node, calculating a delay difference between two consecutive access nodes based on the delay information, and modifying the delay experienced by data transmission for the respective access node which is identified by the respective smaller delay.

According to further developments of the present invention the modifying resides in increasing the delay experienced by data transmission for the respective access node which is identified by the respective smaller delay;

the delay is increased by the amount of the delay difference;

the delay experienced by data transmission between a respective access node and the network control node is composed by a transmission and switching delay component and an adaptation layer delay component;

the modifying affects the adaptation layer delay component;

the adaptation layer delay component of the access node of consecutively arranged network access nodes identified by the largest delay is set to a predetermined minimum value;

the transmission protocol is a packet switched transmission protocol;

the transmission protocol is a cell switched transmission protocol;

the transmission protocol is the Asynchronous Transfer Mode ATM; and the modifying the delay is accomplished by correspondingly modifying the amount of buffering of data.

Still further, the present invention is an access network control node as well as to an access node, respectively which implement the above defined method.

Accordingly, the present invention has the following advantages as compared to previous solutions:

1) the capacity utilization on the interface (Iub) is improved, 2) due to improved capacity utilization, less overall capacity is required to be provisioned, 3) transmission costs can be saved by the network operator, 4) as the Iub transmission link may consume the same amount of delay for every base station BS, those base stations located closer to the radio network controller may then utilize additional buffering (causing an increased delay) for its own traffic, with the increased buffering possibility enables larger statistical multiplexing gain while maintaining transmission quality, 5) even if AAL2 is replaced by IP(UDP) (Internet Protocol/User Datagram Protocol) then the principle of the present invention may be transferred to the IP multiplexing layer which is then allowed to show a larger multiplexing delay, thus, the present invention provides flexibility to be applied for different communication network transmission protocols.

BRIEF DESCRIPTION OF THE DRAWINGS

The above and other objects, features and advantages of the present invention will become more fully apparent upon reference to the accompanying drawings, in which.

DETAILED DESCRIPTION OF THE EMBODIMENTS

The present invention will now be described in greater detail.

According to the present invention, data transmission from different base stations BS (access nodes) experiences different delays and/or delay variations dependent on the position of the base stations in a chain of consecutively arranged base stations, the chain being connected at one end to a radio network controller (access network control node). Thus, it is possible to allow the base station imposing the least delay to consume more delay.

Generally spoken, as regards a communication connected to the access network control node by an intermediate of at least one access node, a delay information of the delay experienced by data transmission between a respective network access node and the access network control node is derived, a delay difference between two consecutive access nodes based on the delay information is calculated, and the delay experienced by data transmission for the respective access node which is identified by the respective smaller delay is modified. The modification is accomplished such that the overall delay is made equal for each base station in a respective chain of base stations.

Figure 2:
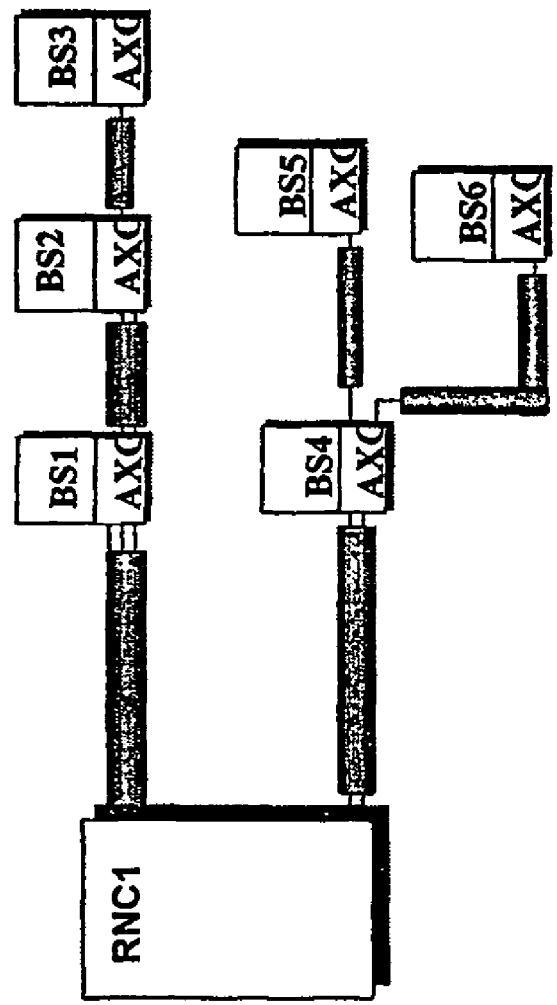
FIG. 2 illustrates an example of a network topology for supporting the explanation of the method according to the present invention.

Thus, with reference to FIG. 2 and the upper chain of base stations, it is possible to allow more delay to be consumed for buffering at the base station BS1, without compromising quality of transmission of any of the base stations. This results in larger statistical multiplexing gain for traffic originating from base station BS1, without loss in quality. Similarly, base station BS2 may be allowed to use some more buffering than the last base station, i.e. BS3, in the chain uses.

The AAL2/ATM packetization, multiplexing and depacketization delay of the nearer base station (of a pair of consecutive base stations in a chain) is modified by increasing the delay imposed thereby, to thereby compensate for the larger transmission and switching delay of the farther away base station(s). In this way, the capacity utilization of the virtual channels serving the near base stations can be improved.

Stated in other words, the AAL2 multiplexing delay configuration of delays and/or delay variations taken effect for those NCID VC connections (network connection identifier virtual channels) that experience smaller transmission and switching delays and delay variations.

For example, assume a case of two consecutive base stations (for example BS4, BS5 or BS4, BS6 in FIG. 2). Then, if the last (farthest away from the RNC) experiences a 5 ms longer delay than the first base station, these 5 ms are available for the first base station to be used at the AAL2 multiplexing layer. These additional 5 ms have a significant effect on the link utilization and the capacity savings to easily amount up to multiples of ten percent (for the traffic handled by the first base station).

In case of two chained base stations as mentioned above, the transmission and ATM switching delays (from the physical media up to the ATM multiplexing) to the near and far base stations are assumed to be 5 ms and 10 ms, respectively. According to the present invention, this is compensated by configuring the AAL2 multiplexing delays as 9 ms and 4 ms, respectively.

Figure 1:
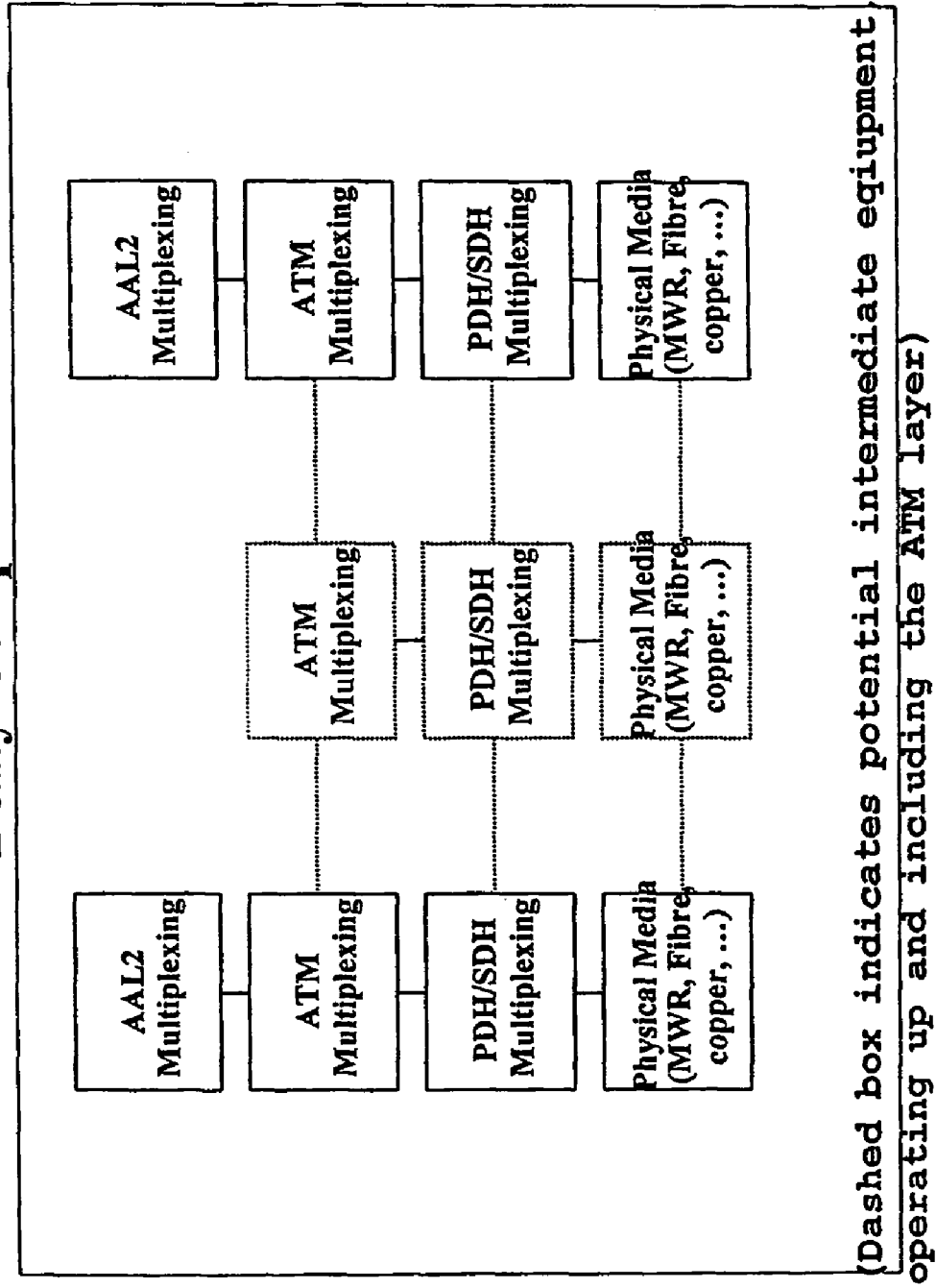
FIG. 1 illustrates delay components of a transmission via the Iub interface.

The 4 ms bound (minimum value) is conformant to the 3GPP proposal of having 7 ms for AAL2/ATM packetization, multiplexing and depacketization (AAL2 multiplexing & ATM multiplexing blocks in FIG. 1), if it is assumed that the ATM multiplexing takes 2 ms of the total 7 ms budget and 1 ms is left for packetization and depacketization.

Apparently, upon configuring the AAL2 multiplexing delay as described in the numerical above, both base station will impose the identical (total) delay on data transmitted by them, and the previously present difference in delay has been compensated.

By choosing a minimum of 4 ms for AAL2 multiplexing under the assumptions made in the given example, the method according to the present invention still remains compatible to the previous 3GPP proposal.

The present invention is also related to accordingly adapted network nodes, that is control nodes RNC and access nodes BS. As regards the control nodes RNC, in connection with the present invention, the control nodes are adapted to support or support several AAL2 multiplexing delay bounds in the Iub. This is achieved by provisioning additional memory, for such CAC (connection admission control) algorithms to be used that require large pre-calculated tables for each QoS class. As regards the accordingly adapted access nodes, that is base stations BS, these include a parameter representing a configurable multiplexing delay, and also a base station BS has a configurable buffer size (HW memory effect). Of course, the network management supports the configuration of the extra provisioned parameters, and also network planning tools and network dimensioning tools support a configurable delay, and dimensioning naturally has to account for the extra statistical multiplexing gain.

Accordingly, as has been described above, the present invention is a method for configuring a data transmission interface in a communication network adopting a transmission protocol for transmission of data in units of grouped data, wherein the transmission interface is the interface (Iub) between an access network control node (RNC1) and an access node (BS1-BS6) which establishes a communication to a terminal, and wherein the communication network has a topology such that an access node (BS2, BS3, BS5 and BS6) is connected to the access network control node (RNC1) by an intermediate of at least one further access node (BS1,BS1-BS2, BS4, BS4), the method comprising the steps of: deriving delay information of the delay experienced by data transmission between a respective network access node (BS1-BS6) and the access network control node (RNC), calculating a delay difference between two consecutive access nodes (BS1-BS2, BS2-BS3, BS4-BS5 and BS4-BS6) based on the delay information, and modifying the delay experienced by data transmission for the respective access node which is identified by the respective smaller delay. Also, the present invention is an access network control node as well as an access.

Although the present invention has been described herein above with reference to its preferred embodiments, it should be understood that numerous modifications may be made thereto without departing from the spirit and scope of the invention. It is intended that all such modifications fall within the scope of the appended claims.

In particular, although a radio network controller RNC according to 3GPP specifications is mentioned, this is intended only as an example for an access network control node without any intent to limit the present invention thereto. Similarly, although a base station BS and/or Node_B according to 3GPP specifications is mentioned as an access node, this is intended only as an example for an access node without any intent to limit the present invention thereto.

The invention claimed is:

1. A method for configuring a data transmission interface in a communication network using a transmission protocol for transmission of data in units of grouped data, wherein the transmission interface is the interface between an access network control node and an access node which establishes a communication to a terminal, and wherein the communication network has a topology such that an access node is connected to the access network control node by an intermediate of at least one further access node, the method comprising:
deriving delay information of the delay experienced by data transmission between a respective network access node and the access network control node;
calculating a delay difference between two consecutive access nodes based on the delay information; and modifying the delay experienced by data transmission for the respective access node which is identified by the respective smaller delay.

2. A method according to claim 1, wherein:
the modifying comprises increasing delay experienced by data transmission for a respective access node which is identified by a respective smaller delay.

3. A method according to claim 2, wherein:
the delay is increased by an amount of the delay difference.

4. A method according to claim 1, wherein:
the delay experienced by data transmission between a respective access node and the network control node is resultant from a transmission and switching delay component and an adaptation layer delay component.

5. A method according to claim 4, wherein:
the modifying affects the adaptation layer delay component.

6. A method according to claim 4, wherein:
the adaptation layer delay component of the access node of consecutively arranged network access nodes identified by the largest delay is set to a predetermined minimum value.

7. A method according to claim 1, wherein:
the transmission protocol is a packet switched transmission protocol.

8. A method according to claim 1, wherein:
the transmission protocol is a cell switched transmission protocol.

9. A method according to claim 8, wherein:
the transmission protocol is the Asynchronous Transfer Mode ATM.

10. A method according to claim 1, wherein:
the modifying of the delay is accomplished by correspondingly modifying an amount of buffering of data.

11. An apparatus comprising:
an access network control node configured to
derive delay information of the delay experienced by data transmission between the access network control node and a respective network access node,
calculate a delay difference between two consecutive access nodes based on the delay information, and
modify the delay experienced by data transmission for a respective access node which is identified by a respective smaller delay.

12. An apparatus of claim 11, wherein modify the delay comprises increasing delay experienced by data transmission for a respective access node which is identified by a respective smaller delay.

13. An apparatus of claim 12, wherein the delay is increased by an amount of the delay difference.

14. An apparatus of claim 11, wherein the delay experienced by data transmission between a respective access node and the network control node is resultant from a transmission and switching delay component and an adaptation layer delay component.

15. An apparatus of claim 14, wherein the modifying affects the adaptation layer delay component.

16. An apparatus of claim 14, wherein the adaptation layer delay component of the access node of consecutively arranged network access nodes identified by the largest delay is set to a predetermined minimum value.

17. An apparatus of claim 11, wherein the transmission protocol is a packet switched transmission protocol.

18. An apparatus of claim 11, wherein the transmission protocol is a cell switched transmission protocol.

19. An apparatus of claim 18, wherein the transmission protocol is the Asynchronous Transfer Mode ATM.

20. An apparatus of claim 11, wherein the modifying of the delay is accomplished by correspondingly modifying an amount of buffering of data.

21. A system comprising:
an access network control node;
a network access node configured to establishes communication to a terminal; and
a transmission interface configured to interface the access network control node and the network access node using a transmission protocol for transmission of data in units of grouped data, wherein the transmission interface comprises an intermediate access node,
wherein the access network control node is configured to
derive delay information of a delay experienced by data transmission between the access network control node and the network access node,
use the delay information to calculate a delay difference between the access node and the intermediate access node, and
modify the delay experienced by data transmission for a respective access node which is identified by a respective smaller delay.

* * * * *